United States Patent
Evans et al.

[15] 3,664,976
[45] May 23, 1972

[54] POLYURETHANE FOAM WITH INTEGRAL SKIN

[72] Inventors: Robert G. Evans, Fergus, Ontario; George R. P. Stifel, Kitchener, Ontario, both of Canada

[73] Assignee: Uniroyal Ltd., Montreal, Quebec, Canada

[22] Filed: Aug. 21, 1969

[21] Appl. No.: 852,106

[52] U.S. Cl. ............260/2.5 BD, 260/2.5 AM, 260/2.5 AZ, 264/45, 264/54
[51] Int. Cl. .................................................C08g 22/46
[58] Field of Search...............260/2.5 AM, 2.5 AX, 2.5 AZ, 260/75 NP, 77.5 AM, 77.5 AP, 858, 2.5 BD; 264/41, 45, 54

[56] References Cited

UNITED STATES PATENTS

| 2,998,403 | 8/1961 | Müller et al. | 260/858 |
| 3,178,490 | 4/1965 | Petrino et al. | 264/41 |
| 3,182,104 | 5/1965 | Cwik | 264/45 |
| 3,489,698 | 1/1970 | Morehouse | 260/77.5 |
| 3,493,634 | 2/1970 | Kolycheck | 260/75 |

FOREIGN PATENTS OR APPLICATIONS

| 765,420 | 8/1967 | Canada | 260/77.5 |

Primary Examiner—Donald E. Czaja
Assistant Examiner—Eugene C. Rzucidlo
Attorney—James J. Long

[57] ABSTRACT

Flexible foam with a soft skin is made by a one-shot process involving overpacking a mold with a mixture, in critical proportions, of: (a) a methylenebis(phenyl isocyanate) having a functionality between 2 and 2.7; (b) an hydroxyl terminated polyoxypropylene ether triol immiscible with (a); (c) an hydroxy terminated polyester miscible with (a) but immiscible with (b); (d) a low molecular weight glycol; (e) a volatile liquid blowing agent; and (f) a catalyst. During the mixing, an emulsion is formed thus preventing separation of the ingredients (foam defects). Due to its discontinuity the emulsion gives controlled rupture of cell walls (open cell foam). No surface active agent is used to control cell structure.

10 Claims, No Drawings

POLYURETHANE FOAM WITH INTEGRAL SKIN

This invention relates to a one-shot formulation for making a flexible elastomeric polyurethane foam having an integrally formed solid skin, and to a method of making such foam, as well as the foam so produced.

Although a skin tends to form naturally on polyurethane foam during the foam formation, such skin is relatively thin. In recent years it has become commercially important to obtain a skin of substantial thickness.

U. S. Pat. No. 3,178,490, Petrino et al., Apr. 13, 1965, discloses a rigid polyurethane foam having a dense skin. The present invention is concerned with the problem of making a flexible, resilient, shock-absorbing foam with a soft integral skin.

French Pat. No. 1,482,031, Societe Quillery, Apr. 17, 1967, discloses a method of making polyurethane foam with a solid skin, using a certain type of polyfunctional compound. The present invention is directed to a novel method of controlling cell structure, relying on immiscibility of ingredients, and provides a soft-skinned, flexible foam.

The invention is accordingly directed to the production of flexible polyurethane foam articles having an integral skin which is soft to the touch even at ridges and corners of the molding, and which will not cause injury if they come into forcible contact with the human body. The method of the invention produces soft corners combined with good tear strength. This enables designers, such as automotive interior trim designers, to incorporate ridges and corners on trim parts without producing injurious protrusions. In order to obtain a satisfactory foam with the properties required (softness combined with toughness) it is necessary to use a system of low crosslink density. With such systems, it is very difficult to obtain an integral skin foam that will neither shrink nor have skin imperfections. The invention is directed to overcoming such difficulties.

The invention is a one-shot process for making polyurethane foam, using the following ingredients:

a. a methylenebis (phenyl isocyanate) having a functionality of from 2 to 2.7;

b. an hydroxyl terminated polyoxypropylene ether of a trihydroxy compound having a molecular weight of from 1,500 to 6,500;

c. an hydroxyl terminated polyester having a molecular weight of from 500 to 3,000 which is a polyester of a dicarboxylic acid and a glycol; and d. a low molecular weight diol. The formulation contains the polyether (b) and polyester (c) in weight ratio of at least 1:1 but less then 9:1. The amount of low molecular weight glycol (d) employed is from 1 to 3 equivalents per equivalent of polyether (b) plus polyester (c). The amount of isocyanate (a) employed is sufficient to provide isocyanate equivalents amounting to between 0.9 to 1.15 times the total number of hydroxyl equivalents in the polyether (b) plus polyester (c) plus low molecular weight diol (d) (that is to say, the "isocyanate index" lies between 0.9 and 1.15). The mixture further contains a small, catalytic amount of a catalyst for the reaction of isocyanate with hydroxyl to form the desired polyurethane elastomer. To bring about foaming, the mixture contains a volatile liquid blowing agent.

An important characteristic of the foregoing formulation is that the polyether (b) is immiscible with the polyester (c) and with the isocyanate (a), whereas the polyester (c) is miscible with the isocyanate (a). Control of cell structure in the foam is achieved entirely through this unique characteristic, rather than by the use of surfactants or similar cell control agents or cell wall breaking agents, such as silicones, which are not only unnecessary but actually detrimental to the desired characteristics of the foam in the present system.

To produce the foam, the described ingredients are mixed together thoroughly in a liquid state, and the mixture is immediately charged to a closed mold having a cavity in the shape of the desired article. A conventional foam mixing machine or equivalent high speed mixer may be used to combine the materials. The various ingredients may be introduced to the mixture separately, or appropriate combinations of the ingredients may be premixed and thereafter combined to form the final mix which is introduced to the mold. The mold is then closed.

The mixture commences to foam within a very short time from the commencement of stirring. The polyurethane-forming reaction of the ingredients is exothermic, and the heat thus generated causes the blowing agent to volatilize, thus producing the foam. The foam has a tough, flexible, high density skin that takes on the shape of the mold, including the surface characteristics of the mold cavity, whether a smooth surface or whether a finely detailed surface, such as a leather grain pattern.

An important feature of the invention is that the mold is moderately overcharged, that is, the amount of the mixture introduced into the mold cavity is in excess of the amount that would be required to produce a volume of foam equal to the volume of the mold cavity, if the mixture were allowed to expand freely in an open container. For this purpose, the amount of foamable mixture charged to the mold is suitably from 1.1 to 2 times the amount which would form a foam equal in volume to the volume of the mold cavity if allowed to expand freely.

During the mixing, immediately prior to the reaction, a transient emulsion is formed. It is believed that this emulsion formation prevents major separation of the immiscible ingredients that would result in local foam defects, e.g., void formation, tacky spots and skin defects. It also forms fine discontinuities in the cell walls that cause the cell walls to break to give a continuous open-cell foam rather than a closed cell foam. If the system were entirely miscible, the cell walls would not break and the foam would shrink as the blowing agent vapor cools. This is of particular importance with an elastomeric foam where the membranes between cells are too elastic to break under foaming pressure. With a continuous foam system, air is able to diffuse throughout the foam and prevent cell shrinkage.

Considering in more detail the various essential ingredients of the present polyurethane formulation, and considering in particular the isocyanate ingredient (a), this is, as indicated, a form of methylenebis (phenyl isocyanate) chosen to have a functionality between 2 and 2.7. As low a functionality as possible (that is, the functionality is preferred to be as near 2 as is possible) is chosen in order to improve the tear resistance of the polymer by reducing the degree of crosslinking. Although the invention extends to the use of methylenebis (phenyl isocyanate) itself, which has a functionality of 2, it is more convenient in practice to use material that has been modified to remain liquid at room temperature. Pure 4,4'-methylenebis (phenyl isocyanate) solidifies at 35°–42° C. The commercial product containing approximately 90 percent of 4,4'-and 10 percent of 2,4'-methylenebis(phenyl isocyanate) can be used at temperatures above 30° C, but its use requires a machine with pumps, hoses and mixing device heated to above 30° C.

Crude forms of methylenebis(phenyl) isocyanate) normally include polyisocyanates of higher functionality as is explained in Canadian Pat. No. 765,420, Erner et al., Aug. 15, 1967. Such crude forms, if used as the sole or major source of isocyanate give poor elastomer properties. When used as minor sources of isocyanate the tear strength decreases as the content of crude isocyanate increases. Preferred for use in the invention is the modified product, based on substantially difunctional isocyanate, described in said patent, which remains liquid at room temperature. Such modified product may be described as a storage stable liquid at temperatures above about 15° C, obtained by heating a methylenebis(phenyl isocyanate) which is normally solid at about 15° C with from about 0.1 percent to about 3 percent by weight of a trihydrocarbyl phosphate, particularly a trialkyl phosphate such as triethyl phosphate, at a temperature within the range of about 160° C to about 250° C, usually until the isocyanate equivalent of the reaction mixture is within the range of about 130 to about 150. A typical commercial product of this kind is described as having a functionality of 2.2.

The polyether (b) employed is, as indicated, an hydroxyl terminated polyoxypropylene ether of at least one simple trihydroxy compound such as, but not limited to, glycerol, trimethylolpropane, 1,2,6-hexanetriol. Optionally, ethylene oxide is also incorporated in the polyether to raise the incidence of primary hydroxyl groups and thereby increase the reactivity toward isocyanates. It will be understood that the trifunctional polyether may be obtained by reacting propylene oxide with, for example, glycerol. The hydroxyl groups on the glycerol react with the propylene oxide to give ether-linked polymer chains terminated with an hydroxyl group. To obtain a trifunctional polyether of 3,000 molecular weight, for example, approximately 3 percent of the total weight of the final product should be glycerol. Similarly 6 percent of glycerol would give a 1,500 molecular weight polyol. Due to the nature of the reaction, the terminal end groups of a polyol based on propylene oxide are mainly secondary. Secondary hydroxy groups react more slowly with isocyanates than do primary. In order to speed up the reactivity, the polyol manufacturers may replace part of the propylene oxide with ethylene oxide. This has the effect of terminating some of the polymer chains with primary hydroxyl groups, as ethylene oxide does not form secondary hydroxyls by normal ring opening. More than one such polyether may be used if desired.

As indicated, the polyether is immiscible with the presently employed type of isocyanate.

The hydroxyl terminated polyester (c) employed in the invention may be made by the reaction of at least one difunctional organic acid or anhydride (for example, adipic, maleic, succinic, phthalic, azeleic, pimelic, malonic, glutaric, suberic, sebacic, isophthalic, terephthalic acid, and the like), and simple dihydroxy compounds (for example, diethylene glycol, ethylene glycol, 2-ethylhexane-1,3-diol, pentanediol, dipropylene glycol, and the like) or mixtures of such dihydroxy compounds. Optionally small amounts of a trihydroxy compound (e.g., glycerol, trimethylolpropane) may be added to give some branching. Such polyesters have low acid numbers and low water contents to insure that the major reactivity to isocyanate is through the hydroxyl groups. It is important to note that such polyesters are miscible with the presently employed isocyanate, but immiscible with the above-described polyether. More than one such polyester may be used if desired.

The low molecular weight glycol (d) employed in the invention is exemplified by such materials as ethylene glycol, propylene glycol, butanediol, diethylene glycol, dipropylene glycol, tripropylene glycol, and similar alkylene glycols. The glycol must be relatively free from water. Although small proportions of tri- and tetrahydroxy compounds may be added to increase the compression strength of the foam, they increase the crosslink density and reduce the tear resistance, and therefore should not be used except in small amounts. It will be understood that the difunctional low molecular weight glycol acts as a chain extender. The glycol is also referred to as a reaction initiator. The use of only difunctional initiator increases the chain length between crosslinks, while increasing the number of urethane groups, and enhances the tear strength.

The catalyst employed in the invention may be any known catalyst conventionally used for the reaction between hydroxyl and isocyanate to form polyurethane. Such catalysts include, by way of non-limiting example, tin based catalysts and amine based catalysts. The catalyst is used in conventional, small, catalytic amounts.

Regarding the blowing agent employed in the invention, this is, as indicated, a volatile liquid which vaporizes at the temperature attained in the mold as a result of the exothermic polyurethane-forming reaction. It is preferred to use trichloromonofluoromethane as its boiling point (approximately 23° C) is the most suitable for use with the other raw materials at room temperature. Other blowing agents such as methylene dichloride or trichlorotrifluoroethane can be used but larger quantities are required as the higher boiling blowing agent is absorbed by the polymer, and then released slowly giving a molded article of reduced dimensions.

The ingredients are preferably used in such proportions that the isocyanate is in slight excess of that quantity sufficient to react with the available hydroxyl groups on the various polyols.

The catalyst level is chosen to give a rapid formation of polymer and foam. The quantity of blowing agent is adjusted to give the required foam density.

A preferred method of mixing the ingredients involves predispersion of the polyether and polyester phases in each other. This assists in rapid incorporation of the polyisocyanate into the emulsion as the polyol phase is already partially emulsified before the isocyanate is added. The incorporation of a polyester polyol miscible with the polyisocyanate increases the volume of the isocyanate phase to that required to give a stable emulsion with the polyether. It is desired to point out that if the polyester were used alone as the major polyol, the resultant foam would have closed cells, and shrink considerably. On the other hand, if the polyether were used as the sole major polyol, it would give rise to various foam defects due to immiscibility problems.

Immediately after mixing, the formulation is charged to the mold, and the mold is closed. Unlike certain prior art process, the mold in the present process may be made of either thermally conductive or thermally insulating materials. Controlled skin formation is possible, in the present process, against a variety of mold surfaces including metal, epoxy resin, and silicone elastomer.

In typical products of the invention the foam density ranges from 8 to 30 pounds per cubic foot, preferably 18 to 25. The skin on the other hand is considerably denser ranging from 35 to 50 pounds per cubic foot. Typically the skin thickness is from 0.025 to 0.125 inch, preferably about 0.06 to 0.09. There is a sharp transition from the solid skin to the foam core.

Tear strength is measured by the split tear strength of the foam and is frequently in excess of about 2 pounds per linear inch (e.g., 3.3 pounds) on 18 pound per cubic foot foam.

Linear shrinkage of the final product is ordinarily not greater than 1 to 3 percent if trichloromonofluoromethane is the blowing agent. Slightly higher figures (e.g., 6 percent) are common if methylene dichloride is used.

The following examples in which all quantities are expressed by weight unless otherwise indicated will serve to illustrate the practice of the invention in more detail.

EXAMPLE I

The following recipe is employed.

| | Parts | Equivalents |
|---|---|---|
| Polyether triol | 85 | 0.085 |
| Polyester | 15 | 0.0141 |
| 1,4-Butanediol | 9 | 0.2 |
| Methylene bis(phenyl isocyanate) | 45.3 | 0.315 |
| Trichloromonofluoromethane | 4.0 | |
| Dibutyltin dilaurate | 0.2 | |

The polyether triol employed is a trifunctional (trihydroxy) polyol having a molecular weight of 3,000 made by reacting propylene oxide with glycerol (a small amount of ethylene oxide may be used as a modifier to give what is known as a "primary capped" polyol); the commercial material known as Voranol CP 3001 (Dow Chemical) is suitable.

The polyester employed is poly(diethylene glycol adipate), molecular weight about 2,300, hydroxyl number 53, equivalent weight 1,060 (a slight degree of branching may be introduced by including a small amount of glycerol or other triol in the preparation of the polyester); the commercial material known as Fomrez 50 (Witco Chemicals) is suitable.

The 1,4-butanediol employed is urethane grade, substantially free of water. The isocyanate employed may be obtained by modifying methylenebis(phenyl isocyanate) with triethyl phosphate as described in Example 2 of Canadian Pat. No. 765,420; the commercial material known as Isonate 143L Upjohn Corp.) is suitable.

The amount of the blowing agent, trichloromonofluoromethane, may be varied between 3 and 10 parts, depending on the batch size and required density.

The polyether and the polyester are pre-combined and mixed thoroughly; this mixture is combined with the other ingredients in a conventional foam mixing machine, at room temperature. The mixture is immediately charged to a mold (e.g., epoxy resin mold) having the shape of an arm rest for an automobile. The mold is then closed. The volume of the mold cavity is 1,090 cc.; the amount of material charged to the mold is 456 gms. The mixture begins to foam ("cream time") in 10 seconds and is risen fully ("rise time") within 30 seconds. It is demolded in 4 minutes. It will be understood that the urethane-forming reaction between the isocyanate and the polyols is exothermic, and the heat thus generated in the mixture in the mold causes the blowing agent to volatilize to product the foam. The molded piece has a skin of about 0.09 inch thickness (density 43 pounds per cubic foot) on the surface of the foam, with a clear line of demarcation between the solid skin and the foam core. The density of the core is 25.5 pounds per cubic foot. The same charge, when allowed to blow freely in an open mold, gives a density of 18.4 pounds per cubic foot and a volume approximately 1.4 times that of the closed mold.

Both the skin and the foam core are soft, flexible, tough materials; the skin is tear resistant and the foam is shock-absorbing. The foam cells are intercommunicating because the polyether ingredient of the foam, being immiscible with the polyester and diisocyanate, forms discontinuities in the cell walls which lead to rupture of the cell walls without using any added surfactant or cell control agent.

EXAMPLE II

This example shows the lower limit on the ratio of polyether to polyester useful in the invention. The materials employed are the same as in Example I; the recipe is as follows:

| | Grams |
|---|---|
| Polyether | 90 |
| Polyester | 10 |
| Dibutyltin dilaurate | 0.6 ml. |
| 1,4-Butanediol | 9.0 |
| Methylenebis (phenyl isocyanate) | 45.3 |
| Trichloromonofluoromethane | 7.5 |

The procedure described in Example I is followed. Upon removal from the mold, signs of immiscibility are observed on the bottom of the casting. A double skin is formed due to complete rupture of the unstable foam close to the mold surface. This indicates that there is insufficient polyester in the formulation to form an emulsion.

EXAMPLE III

This example shows the upper limit of the polyester: polyether ratio useful in the invention. The materials employed are the same as in Example I; the recipe is as follows:

| | Grams |
|---|---|
| Polyether | 50 |
| Polyester | 50 |
| Dibutyltin dilaurate | 0.6 ml. |
| 1,4-Butanediol | 9 |
| Methylenebis (phenyl isocyanate) | 45.3 |
| Trichloromonofluoromethane | 7.5 |

The procedure of Example I is followed. The foam shrinks a little but handling restores its size. The need for handling (i.e., some crushing of the cell walls) shows that too many closed cells are formed.

EXAMPLE IV

This example illustrates the fact that if the high molecular weight polyol portion of the formulation is made up entirely of polyester (a completely miscible system), rather than a dispersion of polyether in polyester, unsatisfactory results are obtained, particularly from the standpoint of undesirable shrinkage. The ingredients are the same as in Example I (except for the absence of the polyether) according to the following formulation:

| | Grams |
|---|---|
| Polyester | 100 |
| 1,4-Butanediol | 9 |
| Dibutyltin dilaurate | 0.6 ml. |
| Methylenebis (phenyl isocyanate) | 50.7 |
| Trichloromonofluoromethane | 10 |

The procedure of Example I is followed. The resulting foam shrinks to one-fourth size overnight. This indicates that the cell walls in the formulation are too strong to fracture during foaming.

EXAMPLE V

In this example the polyester employed is a reaction product of adipic acid and diethylene glycol of equivalent weight 1,215 as hydroxyl (e.g., the commercially available material known as Multron R-68). The other ingredients are the same as in Example I, according to the following recipe:

| | Grams |
|---|---|
| Polyether | 85 |
| Polyester | 17.2 |
| 1,4-Butanediol | 9 |
| Dibutyltin dilaurate | 0.6 ml. |
| Methylenebis (phenyl isocyanate) | 45.3 |
| Trichloromonofluoromethane | 7.5 |

The procedure of Example I is followed. The foam is similar to that obtained in Example I, except slightly softer.

EXAMPLE VI

In this example the catalyst employed is triethylene diamine, conveniently in the form of a 33 percent solution of triethylenediamine in a low molecular weight diol (e.g., dipropylene glycol), as represented by such commercially available materials as Dabco 33 LV. The remaining ingredients are the same as in Example I, according to the following recipe:

| | Grams |
|---|---|
| Polyether | 85 |
| Polyester | 15 |
| 1,4-Butanediol | 9 |
| Catalyst (33% triethylenediamine) | 0.6 ml. |
| Methylenebis (phenyl isocyanate) | 45.3 |
| Trichloromonofluoromethane | 7.5 |

The procedure of Example I is followed. The cream time is about 30 seconds. The demolding time is 15 minutes. This indicates that the amine catalyst is slower than the organo-tin catalyst used in previous examples.

EXAMPLES VII – XII

These examples illustrates variations in the quantity of the chain extender, 1,4-butanediol. The ingredients are the same as in Example I, according to the recipes of the following table:

| | VII | VIII | IX | X | XI | XII |
|---|---|---|---|---|---|---|
| Polyether | 85 | 85 | 85 | 85 | 85 | 85 |
| Polyester | 15 | 15 | 15 | 15 | 15 | 15 |
| 1,4-Butanediol | 4.5 | 6.8 | 9 | 11.2 | 13.5 | 15.6 |

|  | VII | VIII | IX | X | XI | XII |
|---|---|---|---|---|---|---|
| Dibutyltin dilaurate | .6ml. | .6 | .6 | .6 | .6 | .6 |
| Methylenebis (phenyl isocyanate) | 30.1 | 37.8 | 45.3 | 52.8 | 60.4 | 68.0 |
| Trichloromonofluoromethane | 7.5 | 7.5 | 7.5 | 7.5 | 7.5 | 7.5 |
| Equivalents of butanediol per equivalent of polyether plus polyester | 1 | 1.5 | 2 | 2.5 | 3.0 | 3.5 |

The procedure of Example I is followed. All except Example XII give good products. Example XII gives an irreversible shrinkage. As the proportion of butanediol increases, the reaction rate increases and the thickness of the skin decreases. In these examples the quantity of isocyanate was adjusted to maintain a constant ratio of isocyanate to total hydroxyl.

EXAMPLE XIII

In this example ethylene glycol is used in place of 1,4-butanediol. The other ingredients are as in Example I.

|  | Grams |
|---|---|
| Polyether | 85 |
| Polyester | 15 |
| Ethylene glycol | 6.2 (0.2 equivalent) |
| Dibutyltin dilaurate | 0.6 ml. |
| Methylenebis (phenyl isocyanate | 45.3 |
| Trichloromonofluoromethane | 7.5 |

The procedure of Example I is followed yielding a satisfactory product.

EXAMPLES XIV – XIX

These examples illustrate the range of variation of the isocyanate hydroxyl ratio ("isocyanate index"), using the same ingredients as in Example I.

|  | XIV | XV | XVI | XVII | XVIII | XIX |
|---|---|---|---|---|---|---|
| Polyether | 85 | 85 | 85 | 85 | 85 | 85 |
| Polyester | 15 | 15 | 15 | 15 | 15 | 15 |
| 1,4-Butanediol | 9 | 9 | 9 | 9 | 9 | 9 |
| Dibutyltin dilaurate | .6 ml. | .6 | .6 | .6 | .6 | .6 |
| Trichloromonofluoromethane | 7.5 | 7.5 | 7.5 | 7.5 | 7.5 | 7.5 |
| Methylenebis(phenyl isocyanate) | 38.6 | 40.8 | 42.9 | 45.3 | 47.2 | 49.3 |
| Isocyanate index | 0.90 | 0.95 | 1.00 | 1.05 | 1.10 | 1.15 |

Following the procedure of Example I, all of the products are satisfactory, the cure rates of the 0.90 and 0.95 isocyanate index formulations being noticeably slower. Maximum resistance to tearing is obtained in the range 0.90–1.05 isocyanate index.

EXAMPLE XX

In this example the polyether employed is of the same type as in Example 1, but has a molecular weight of 1,500. The other ingredients are as in Example I according to the following recipe:

|  | Grams |
|---|---|
| Polyether | 50 |
| 1,4-Butanediol | 9 |
| Polyester | 15 |
| Dibutyltin dilaurate | 0.5 ml. |
| Methylenebis (phenyl isocyanate) | 45.3 |
| Trichloromonofluoromethane | 7.5 |
| Isocyanate index | 1.00 |

This formulation is very fast curing due to the lower molecular weight of the polyether, and gives a very soft foam with good tear strength.

Having thus described our invention, what we claim and desire to protect by Letters Patent is:

1. A one-shot method of making a resilient, shock-absorbing open-cell polyurethane foam having an integral, thick, high density solid skin, said foam and integral skin being made of the same soft, tough, tear-resistant, flexible, elastomeric polyurethane, comprising the steps of
   I. mixing, in a liquid state:
      a. a methylenebis (phenyl isocyanate) having a functionality of from 2 to 2.7;
      b. a trifunctional polyether having a molecular weight of from 1,500 to 6,500 which is an hydroxyl terminated polyoxypropylene ether triol;
      c. an hydroxyl terminated polyester having a molecular weight of from 500 to 3,000 which is a polyester of a dicarboxylic acid and a glycol; and
      d. a low molecular weight glycol, to provide a mixture containing (b) and (c) in weight ratio of at least 1:1 but less than 9:1; the amount of (d) being from 1 to 3 equivalents per equivalent of (b) plus (c), and the amount of (a) being sufficient to provide isocyanate equivalents amounting to between 0.9 and 1.15 times the total number of hydroxyl equivalents in (b) plus (c) plus (d), the said (c) and (a) being miscible and forming a single phase, the said (b) being immiscible with (a) and (c) and forming a separate phase therefrom, the two said phases being mutually dispersed to form a transient emulsion, the said (b) and (c) being predispersed in each other and the said (a) then being incorporated, the said mixture further containing a small catalytic amount of a catalyst for the reaction of isocyanate with hydroxyl, and the said mixture containing trichloromonofluoromethane as a volatile liquid blowing agent,
   II. immediately charging the said mixture into a mold having a cavity of the size and shape of the desired article, wherein the ingredients react to form a polyurethane elastomer which foams as a result of volatilization of the said blowing agent, the amount of mixture contained in the mold being from 1.1 to 2 times the amount which would form a foam equal in volume to the volume of the mold cavity if allowed to expand freely, the cell walls in the foam rupturing to form inter-communicating cells as a result of the presence of said immiscible polyether (b), whereby a shrink-resistant foam is formed, the layer of mixture in contact with the surface of the mold cavity forming a solid integral skin which reproduces faithfully the surface characteristics of the mold cavity; and
   III. thereafter opening the mold and removing the resulting foamed polyurethane article from the mold, the said mixture consisting essentially of the recited ingredients and being devoid of any cell structure controlling agent, the foam having a density of from 8 to 30 pounds per cubic foot and the skin having a density of from 35 to 50 pounds per cubic foot and being from 0.025 to 0.125 inch thick.

2. A method as in claim 1 in which (a) is a storage stable liquid at temperatures above 15° C obtained by heating a methylenebis (phenyl isocyanate) which is normally solid at 15° C with from 0.1 percent to 3 percent by weight of a trialkyl phosphate at a temperature within the range of 160° C to 250° C until the isocyanate equivalent is within the range of 130 to 150.

3. A method as in claim 1 in which (b) is polyoxypropylene ether of glycerol.

4. A method as in claim 1 in which (c) is poly(diethylene glycol adipate).

5. A method as in claim 1 in which (d) is 1,4-butanediol.

6. A method as in claim 1 in which (d) is ethylene glycol.

7. A method as in claim 1 in which the said catalyst is dibutyltin dilaurate.

8. A method as in claim 1 in which the said catalyst is triethylenediamine.

9. A method as in claim 1 in which the said catalyst is selected from the group consisting of triethylenediamine and dibutyltin dilaurate and the said blowing agent is selected from the group consisting of trichloromonofluoromethane, methylene dichloride and trichlorotrifluoroethane.

10. The product of the method of claim 1.

* * * * *